US007565943B2

(12) United States Patent
Herrmann et al.

(10) Patent No.: US 7,565,943 B2
(45) Date of Patent: Jul. 28, 2009

(54) MOBILE MACHINE WITH AN ELECTRIC TRACTION MOTOR OF A TRACTION DRIVE, AN ELECTRIC PUMP MOTOR OF A HYDRAULIC WORK SYSTEM, AND FLUID COOLING

(75) Inventors: Udo Herrmann, Johannesberg (DE); Alfred Langen, Groβostheim (DE); Klaus Schillings, Langenselbold (DE); Volker Schreiber, Niedernberg (DE); Bernward Welschof, Groβostheim (DE)

(73) Assignee: Linde material Handling GmbH, Aschaffenburg (DE)

( * ) Notice: Subject to any disclaimer, the term of this patent is extended or adjusted under 35 U.S.C. 154(b) by 487 days.

(21) Appl. No.: 11/525,523

(22) Filed: Sep. 22, 2006

(65) Prior Publication Data

US 2007/0227691 A1 Oct. 4, 2007

(30) Foreign Application Priority Data

Sep. 23, 2005 (DE) ...................... 10 2005 045 414

(51) Int. Cl.
*B60H 1/00* (2006.01)

(52) U.S. Cl. ........................ 180/305; 180/306; 180/367

(58) Field of Classification Search ................. 180/305, 180/306, 307, 367, 53.4, 68.1, 68.2
See application file for complete search history.

(56) References Cited

U.S. PATENT DOCUMENTS 3,918,546 A * 11/1975 Chichester et al. .......... 180/243
4,132,283 A * 1/1979 McCurry .................... 180/165
5,167,292 A * 12/1992 Moiroux et al. ............. 180/165
5,332,053 A * 7/1994 Vachon ...................... 180/53.4
6,202,783 B1 * 3/2001 Taylor et al. ................ 180/305
7,083,014 B2 8/2006 Forster
7,084,539 B2 8/2006 Forster
7,273,122 B2 * 9/2007 Rose .......................... 180/165
2005/0211493 A1 * 9/2005 Ochs .......................... 180/305

FOREIGN PATENT DOCUMENTS

DE 10063167 A1 6/2002
DE 10339433 A1 3/2005

* cited by examiner

*Primary Examiner*—Christopher P Ellis
*Assistant Examiner*—Brian Swenson
(74) *Attorney, Agent, or Firm*—The Webb Law Firm, P.C.

(57) ABSTRACT

A mobile machine, such as an industrial truck, has heat-emitting drive components (K) of a traction drive and a hydraulic work system. The traction drive includes at least one electric traction motor (3) and a traction motor control system (7). The hydraulic work system includes at least one electric pump motor (5) and a pump motor control system (6). At least some of the drive components (K) are located in a cooling circuit. The cooling circuit has a cooling device (1), to which, on the output side, the traction motor (3), the pump motor (5), the traction motor control (7), and the pump motor control system (6) are connected, and which can be connected on the input side, depending on the fluid temperature in a reservoir (9) of the hydraulic work system, to the reservoir (9) or to a return line of the heat-emitting drive components (K).

10 Claims, 2 Drawing Sheets

MOBILE MACHINE WITH AN ELECTRIC TRACTION MOTOR OF A TRACTION DRIVE, AN ELECTRIC PUMP MOTOR OF A HYDRAULIC WORK SYSTEM, AND FLUID COOLING

CROSS REFERENCE TO RELATED APPLICATION

This application claims priority to German Application No. 10 2005 045 414.3, filed Sep. 23, 2005, which application is herein incorporated by reference in its entirety.

BACKGROUND OF THE INVENTION

1. Field of the Invention

This invention relates to a mobile machine, such as an industrial truck, with heat-emitting drive components of a traction drive and a hydraulic work system. The traction drive comprises at least one electric traction motor and a traction motor control system, and the hydraulic work system comprises at least one electric pump motor and a pump motor control system. At least some of the drive components are located in a cooling circuit connected to the hydraulic work system and can be cooled by fluid from the hydraulic work system.

2. Technical Considerations

A generic mobile machine is described in DE 100 63 167 A1. The mobile machine, which is realized in the form of a fork-lift truck, has a hydraulic work system with which the lifting and tilting cylinders of a lifting apparatus are supplied. DE 103 39 433 A1 discloses a drive axle, inside which the drive components of the traction drive system and the hydraulic work system are installed in a space-saving manner. In both cases, the possibility of a fluid cooling for the electric motors and their power control systems is mentioned. No further details are provided.

An object of this invention is to provide a mobile machine of the general type described above but in which, with little effort, a liquid cooling system is created for the heat-emitting drive components of the traction drive and of the hydraulic work system.

SUMMARY OF THE INVENTION

The invention teaches that the cooling circuit has a cooling device that can be connected on the output side to the traction motor, the pump motor, the traction motor control system, and the pump motor control system, and on the input side, depending on the fluid temperature in a reservoir of the hydraulic work system, to the reservoir and/or to a return line of the heat-emitting drive components.

The invention is thereby based on the knowledge that the temperatures that occur in the hydraulic work system can be so high that a cooling of electrical drive components by such hot hydraulic fluid is not possible, or can be achieved only after prior cooling of the hydraulic fluid in a cooling device, such as an oil cooler, for example, which is provided with a fan.

Therefore, in the mobile machine of the invention, hydraulic fluid from the reservoir of the hydraulic work system is used for the cooling of the heat-emitting components only if a specified temperature of the hydraulic fluid is not exceeded. If the oil temperature in the reservoir is too high, then hydraulic fluid that is there is not fed to a cooling device, but the hydraulic fluid that is flowing back from the heat-emitting components, which is not as hot as the hydraulic fluid in the reservoir of the hydraulic work system, is used directly again for cooling, after it has flowed through a cooling device. The cooling device, therefore, needs to perform less cooling than when the hot hydraulic fluid from the reservoir is used.

Of course, it is also possible to transport hydraulic fluid flowing from the heat-emitting drive components to the cooling device together with hydraulic fluid from the reservoir in "mixed operation", if the cooling capacity of the cooling device is sufficient for that purpose. The cooling device can be a conventional oil cooler in which heat is exchanged with the atmospheric air and which can be assisted by a cooling fan if necessary.

The cooling system of the mobile machine of the invention can be realized passively ("thermo-siphon principle"), although preference is given to an active cooling system in which a pump conveys the hydraulic fluid through the cooling device and the heat emitting drive components. In this case, it is advantageous to use a pump that is already present here, e.g., the pump of the hydraulic work system or a steering pump.

The mobile machine of the invention has, therefore, made it possible using relatively simple means to adapt the cooling to the two most frequent operating conditions.

In one operating condition in which the machine is operated at a high speed of travel, the thermal stress is primarily on the traction motor control system, the traction motor and the other drive components (gear trains, etc.) of the traction system. Under these conditions, the hydraulic work system is either not subjected to any thermal stress or is subjected to relatively little thermal stress so that hydraulic fluid of the hydraulic work system that is located in the reservoir is relatively cold. Therefore, the cooling device is advantageously supplied with cold hydraulic fluid from the reservoir of the hydraulic work system.

When the mobile machine is stationary or traveling slowly (during cargo handling operations, for example), the hydraulic work system is in operation most of the time so that the hydraulic fluid is heated to a relatively high degree. A temperature of 90 degrees, for example, can be reached in the reservoir. The hydraulic fluid that is extracted from the reservoir and is intended for the cooling of the pump motor and of the pump motor control system would, therefore, first have to be cooled to a relatively great degree so that it can be used for the intended purpose. That would require a high cooling capacity and, therefore, a complex and expensive cooling device.

The invention teaches that, depending on the temperature of the hydraulic fluid in the reservoir, the reservoir can be bypassed, whereby the hydraulic fluid that flows back from the heat-emitting drive components is not conducted into the reservoir but directly back to the cooling device so that from there it can flow back out to the electric motors and their control systems (or, optionally, to additional heat-emitting components). The cooling device can, therefore, be sized smaller than in conventional machines because it needs a lower cooling capacity.

In one advantageous development of the invention, the control systems of the electric motors are located upstream of the electric motors in the direction of flow of the cooling fluid.

Accordingly, the heat-emitting components that are present and require cooling are cooled in a specified sequence. For this purpose, first the temperature of the thermally more sensitive power control systems of the electric motors is reduced before the cooling fluid flows through the electric motors and other components, such as mechanical gear trains, brakes, radial bearings, etc., for example.

In one preferred configuration of the invention, the pump motor control system is located in the cooling circuit upstream of the traction motor control system.

The invention also teaches that the pump motor is located in the cooling circuit upstream of the traction motor.

With regard to a simple and effective construction of the mobile machine of the invention, it is advantageous if the traction motor and the pump motor are combined in a single space and are located in a drive axle to which the traction motor control system and the pump motor control system are fastened, with cooling channels machined into the drive axle. The cooling fluid transport can, therefore, be accomplished without significant extra effort at the same time as the machining of the drive axle, which is necessary in any case.

BRIEF DESCRIPTION OF THE DRAWINGS

Additional advantages and details of the invention are explained in greater detail below on the basis of the exemplary embodiment illustrated in the accompanying schematic figures, in which like reference numbers identify like parts throughout.

DESCRIPTION OF THE PREFERRED EMBODIMENTS

Figure 1:
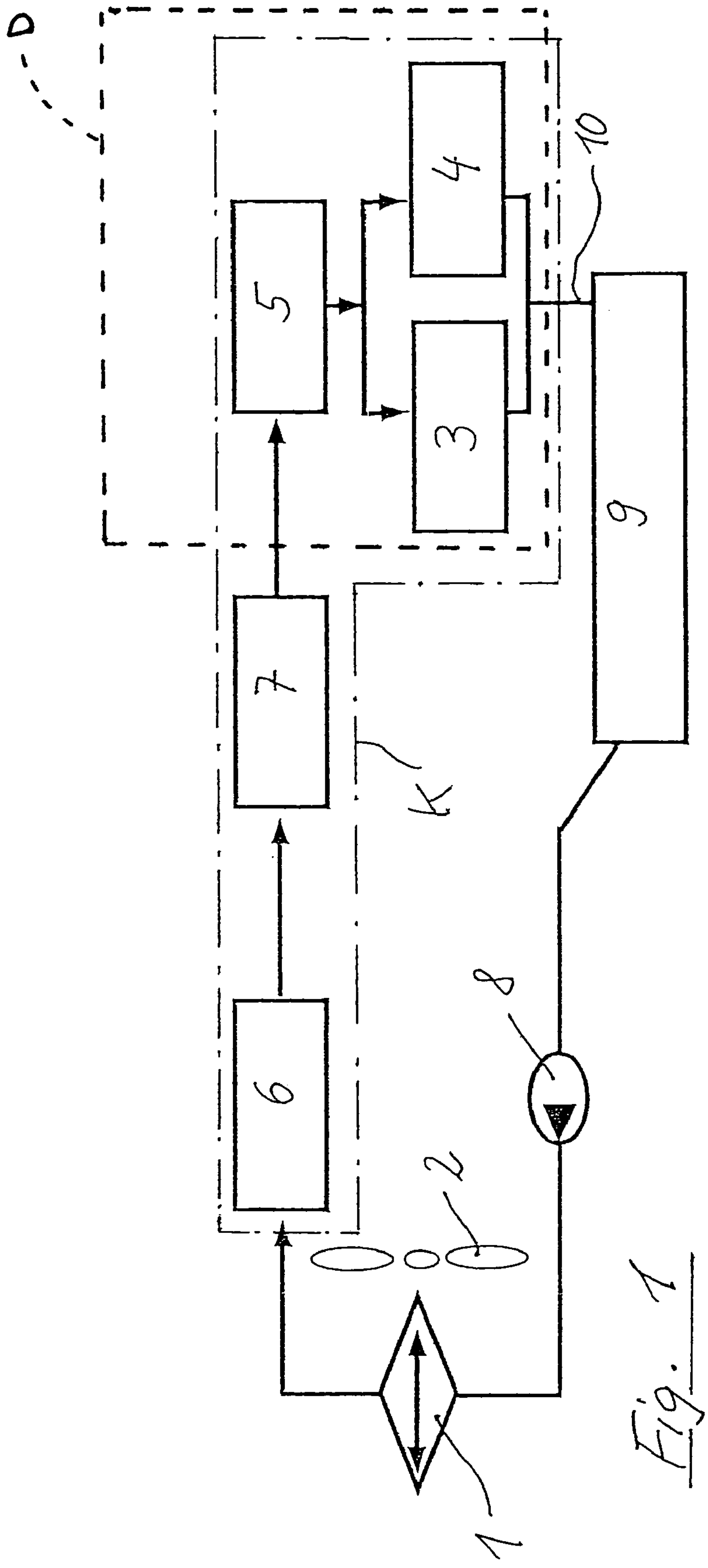
FIG. 1 is a circuit for a first operating condition of a mobile machine of the invention.

The circuit (flow diagram) illustrated in FIG. 1 of a cooling circuit shows a cooling device 1 that can be assisted by a fan 2 and which is connected on the output side to a plurality of heat-emitting drive components K of a traction drive, and also connected to a hydraulic work system of an industrial truck, such as a battery-powered electric fork-lift truck. The hydraulic work system includes the lifting and tilting drive of the fork-lift truck and, optionally, any additional power consumers, such as a side-loader drive, for example.

The drive components that are cooled by the cooling device 1 include an electric traction motor 3, downstream of which is a gear train 4. The traction motor 3 is located, together with the gear train 4, in a drive axle D of a traction drive. The gear train 4 can have integrated brakes (oil-cooled multiple-disc brakes). It is also possible to have two electric traction motors in the drive axles (individual-wheel drive). The hydraulic work system of the mobile machine has an electric pump motor 5, which is preferably also located in the drive axle D, and the output of which is regulated by an electric pump motor control system 6. An electric traction motor control 7 is provided to regulate the output of the traction motor 3.

The cooling device 1 is connected on the input side to a coolant pump 8, which can be formed, for example, by a pump of the hydraulic work system that is already present in the mobile machine. One part of this hydraulic work system is also a reservoir 9 in which the hydraulic fluid of the hydraulic work system is located, and from which the coolant pump 8 in the circuit illustrated in FIG. 1 can draw fluid. The cooled hydraulic fluid that flows out of the cooling device 1 flows first into the control systems of the electric motors, namely, first into the pump motor control 6 and then into the traction motor control system 7. Only then are the electric motors cooled, first the pump motor 5, then the traction motor 3, and simultaneously (although it can also be cooled sequentially) the gear train 4. After the cooling hydraulic fluid has flowed through all of the above-mentioned drive components, it returns to the reservoir 9, from which it can be drawn again.

The circuit illustrated in FIG. 1 is appropriate above all for operating conditions in which the mobile machine has a high speed of travel, in which case there is little or no thermal stress on the hydraulic work system. The hydraulic fluid in the reservoir 9 is thereby relatively cool. The cooling device 1 is, therefore, supplied with relatively cold hydraulic fluid from the reservoir 9 of the hydraulic work system, so that little or no cooling work needs to be performed. The thermal stresses are placed primarily on the traction motor control system 7, the traction motor 3, and the gear train 4.

Figure 2:
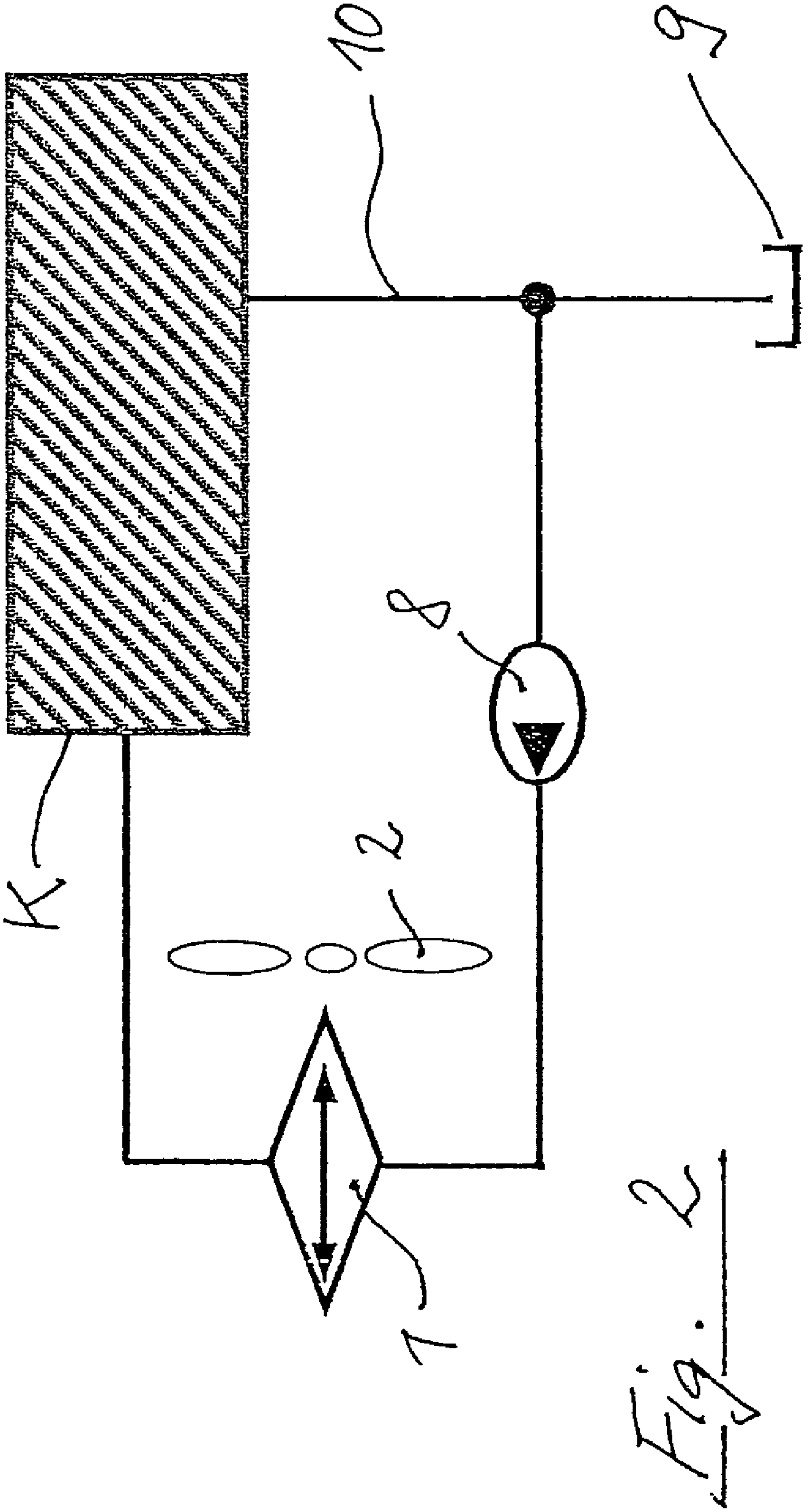
FIG. 2 is a circuit for a second operating condition of a mobile machine of the invention.

If the majority of the load is placed on the hydraulic work system of the mobile machine (e.g., when the mobile machine is stationary during cargo handling operations), the pump motor 5 and the pump motor control system 6 heat up and require cooling. Depending on the thermal stress that is placed on the hydraulic work system, however, the hydraulic fluid in the reservoir 9 is relatively hot so that it would have to be cooled from a relatively high temperature level (e.g., 90 degrees) to a relatively low temperature level required for the cooling of the drive components. The invention teaches that, depending on the temperature of the hydraulic fluid in the reservoir 9, the coolant pump 8 can be selectively connected on the intake side directly to a return line 10 of the drive components K (see FIG. 2). The hydraulic fluid that flows out of the drive components K, and which is not as hot as the hydraulic fluid in the reservoir 9, therefore travels via the return line 10, bypassing the reservoir 9, in which the hot hydraulic fluid is located, directly back to the cooling device 1. This selective connection can be made in any conventional manner, such as by a conventional three-way valve, that can be operated manually or automatically based upon the temperature of the hydraulic fluid in the reservoir.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A mobile machine, comprising:

heat-emitting drive components of a traction drive and a hydraulic work system, wherein the traction drive comprises at least one electric traction motor and a traction motor control system, wherein the hydraulic work system comprises at least one electric pump motor and a pump motor control system, and wherein at least some of the drive components are located in a cooling circuit that is connected to the hydraulic work system and can be cooled by fluid from the hydraulic work system, wherein the cooling circuit includes a cooling device connected on an output side with the traction motor, the pump motor, the traction motor control, and the pump motor control system, and wherein the cooling device can be selectively connected on an input side, depending on fluid temperature in a reservoir of the hydraulic work system, to the reservoir or to a return line from the heat-emitting drive components.

2. The mobile machine as claimed in claim 1, wherein the control systems of the electric motors are located upstream of the electric motors in a direction of coolant flow.

3. The mobile machine as claimed in claim 2, wherein the pump motor is located upstream of the traction motor in a direction of coolant flow.

4. The mobile machine as claimed in claim 3, wherein the traction motor and the pump motor are both located in a drive axle, to which the traction motor control system and the pump motor control system are fastened, with cooling channels machined into the drive axle.

5. The mobile machine as claimed in claim 2, wherein the traction motor and the pump motor are both located in a drive axle, to which the traction motor control system and the pump motor control system are fastened, with cooling channels machined into the drive axle.

6. The mobile machine as claimed in claim 1, wherein the pump motor control is located upstream of the traction motor control system in the direction of coolant flow.

7. The mobile machine as claimed in claim 6, wherein the traction motor and the pump motor are both located in a drive axle, to which the traction motor control system and the pump motor control system are fastened, with cooling channels machined into the drive axle.

8. The mobile machine as claimed in claim 1, wherein the pump motor is located upstream of the traction motor in a direction of coolant flow.

9. The mobile machine as claimed in claim 8, wherein the traction motor and the pump motor are both located in a drive axle, to which the traction motor control system and the pump motor control system are fastened, with cooling channels machined into the drive axle.

10. The mobile machine as claimed in claim 1, wherein the traction motor and the pump motor are both located in a drive axle, to which the traction motor control system and the pump motor control system are fastened, with cooling channels machined into the drive axle.

* * * * *

UNITED STATES PATENT AND TRADEMARK OFFICE

CERTIFICATE OF CORRECTION

PATENT NO. : 7,565,943 B2
APPLICATION NO. : 11/525523
DATED : July 28, 2009
INVENTOR(S) : Herrmann et al.

It is certified that error appears in the above-identified patent and that said Letters Patent is hereby corrected as shown below:

Title Page, Item (73) Assignee: "Linde material Handling GmbH" should read -- Linde Material Handling GmbH --

Signed and Sealed this

Third Day of November, 2009

David J. Kappos
*Director of the United States Patent and Trademark Office*